United States Patent
Beijbom et al.

(10) Patent No.: US 12,130,628 B2
(45) Date of Patent: *Oct. 29, 2024

(54) GROUND PLANE ESTIMATION USING LIDAR SEMANTIC NETWORK

(71) Applicant: Motional AD LLC, Boston, MA (US)

(72) Inventors: Oscar Olof Beijbom, Santa Monica, CA (US); Venice Erin Baylon Liong, Singapore (SG)

(73) Assignee: Motional AD LLC, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/994,437

(22) Filed: Nov. 28, 2022

(65) Prior Publication Data
US 2023/0205216 A1   Jun. 29, 2023

Related U.S. Application Data

(63) Continuation of application No. 17/067,631, filed on Oct. 9, 2020, now Pat. No. 11,521,394.

(51) Int. Cl.
*G05D 1/00* (2024.01)
*B60W 60/00* (2020.01)
(Continued)

(52) U.S. Cl.
CPC ......... *G05D 1/0221* (2013.01); *B60W 60/001* (2020.02); *G06N 3/08* (2013.01);
(Continued)

(58) Field of Classification Search
CPC .... G06V 10/764; G06V 10/776; G06V 10/82; G06V 20/182; G06V 20/56;
(Continued)

(56) References Cited

U.S. PATENT DOCUMENTS 8,396,293 B1 * 3/2013 Korah ............... G06V 20/13
382/170
9,361,696 B2 * 6/2016 Allezard ............... G06T 7/75
(Continued)

FOREIGN PATENT DOCUMENTS

CN 109829399 5/2019
EP 4013049 A1 * 6/2022 ... G06T 2207/10028
(Continued)

OTHER PUBLICATIONS

[No Author Listed] "SAE International: Surface Vehicle Recommended Practice (R) Taxonomy and Definitions for Terms Related to Driving Automation Systems for On-Road Motor Vehicles," SAE J3016, Sep. 30, 2016, 30 pages.
(Continued)

*Primary Examiner* — Dale W Hilgendorf
(74) *Attorney, Agent, or Firm* — Fish & Richardson P.C.

(57) ABSTRACT

Embodiments are disclosed for ground plane estimation (GPE) using a LiDAR semantic network. In an embodiment, a method comprises: obtaining a point cloud from a depth sensor of a vehicle operating in an environment; encoding the point cloud; estimating, using a deep learning network with the encoded point cloud as input, a ground plane in the environment; planning a path through the environment based on a drivable area of the estimated ground plane; and operating the vehicle, the vehicle along the path. The deep learning network includes a two-dimensional (2D) convolutional backbone, a detection head for detecting objects and a GPE head for estimating the ground plane. In an embodiment, point pillars are used to encode the point cloud.

23 Claims, 7 Drawing Sheets

(51) Int. Cl.
  *G06N 3/08* (2023.01)
  *G06T 9/00* (2006.01)
  *G06V 10/764* (2022.01)
  *G06V 10/776* (2022.01)
  *G06V 10/82* (2022.01)
  *G06V 20/10* (2022.01)
  *G06V 20/56* (2022.01)

(52) U.S. Cl.
  CPC ............ *G06T 9/002* (2013.01); *G06V 10/764* (2022.01); *G06V 10/776* (2022.01); *G06V 10/82* (2022.01); *G06V 20/182* (2022.01); *G06V 20/56* (2022.01); *B60W 2420/408* (2024.01); *G06T 2207/10028* (2013.01)

(58) Field of Classification Search
  CPC ........ G05D 1/0221; G06N 3/08; G06T 9/002; G06T 2207/10028; B60W 60/001; B60W 2420/52
  See application file for complete search history.

(56) References Cited

U.S. PATENT DOCUMENTS

| | | | | |
|---|---|---|---|---|
| 10,444,759 | B2* | 10/2019 | Douillard | G05D 1/0212 |
| 10,509,947 | B1* | 12/2019 | Douillard | G06T 3/067 |
| 10,705,220 | B2* | 7/2020 | Kim | G06T 7/11 |
| 10,810,445 | B1* | 10/2020 | Kangaspunta | G06T 3/4046 |
| 11,214,281 | B2* | 1/2022 | Vora | G06T 7/10 |
| 11,238,634 | B2* | 2/2022 | Yang | G06T 7/251 |
| 11,367,289 | B1* | 6/2022 | Widjaja | G01C 21/3833 |
| 11,500,063 | B2* | 11/2022 | Beijbom | G06V 10/764 |
| 11,521,394 | B2* | 12/2022 | Beijbom | G06T 9/001 |
| 11,634,155 | B2* | 4/2023 | Vora | G06T 7/10 382/104 |
| 2010/0098290 | A1* | 4/2010 | Zhang | G08G 1/165 701/41 |
| 2010/0121577 | A1* | 5/2010 | Zhang | G06F 18/256 382/104 |
| 2018/0012082 | A1* | 1/2018 | Satazoda | G06V 10/763 |
| 2018/0203124 | A1* | 7/2018 | Izzat | G01S 17/89 |
| 2018/0364717 | A1* | 12/2018 | Douillard | G01S 17/58 |
| 2019/0050729 | A1 | 2/2019 | Lakshmanan et al. | |
| 2019/0056748 | A1* | 2/2019 | Budihal | G06V 20/58 |
| 2019/0114507 | A1* | 4/2019 | Chiu | G01C 21/206 |
| 2019/0147245 | A1* | 5/2019 | Qi | G06V 10/82 382/103 |
| 2019/0180502 | A1 | 6/2019 | Englard et al. | |
| 2019/0212749 | A1* | 7/2019 | Chen | G06N 20/00 |
| 2019/0243371 | A1 | 8/2019 | Nister et al. | |
| 2019/0258878 | A1 | 8/2019 | Koivisto et al. | |
| 2019/0266418 | A1 | 8/2019 | Xu et al. | |
| 2019/0286153 | A1* | 9/2019 | Rankawat | G05D 1/0246 |
| 2019/0295282 | A1 | 9/2019 | Smolyanskiy et al. | |
| 2019/0324148 | A1* | 10/2019 | Kim | G01S 17/42 |
| 2019/0384303 | A1 | 12/2019 | Muller et al. | |
| 2019/0384304 | A1* | 12/2019 | Towal | G05D 1/0221 |
| 2020/0025935 | A1* | 1/2020 | Liang | G06V 20/64 |
| 2020/0150235 | A1* | 5/2020 | Beijbom | G01S 17/93 |
| 2020/0192391 | A1 | 6/2020 | Vora et al. | |
| 2020/0218979 | A1* | 7/2020 | Kwon | B60W 30/14 |
| 2020/0324781 | A1* | 10/2020 | Hayakawa | G06V 20/56 |
| 2020/0394813 | A1* | 12/2020 | Theverapperuma | G06F 18/2431 |
| 2021/0042575 | A1* | 2/2021 | Firner | G06N 3/084 |
| 2021/0063198 | A1* | 3/2021 | Nister | G06N 3/045 |
| 2021/0063199 | A1* | 3/2021 | Akbarzadeh | G06N 3/08 |
| 2021/0063200 | A1* | 3/2021 | Kroepfl | C03C 17/3644 |
| 2021/0090263 | A1* | 3/2021 | Liu | G01S 7/4808 |
| 2021/0156960 | A1* | 5/2021 | Popov | G06V 10/82 |
| 2021/0278854 | A1* | 9/2021 | Serrano | G05D 1/0276 |
| 2021/0287022 | A1* | 9/2021 | Ferroni | G06V 20/58 |
| 2021/0334645 | A1* | 10/2021 | Pardeshi | G06N 3/045 |
| 2022/0024485 | A1* | 1/2022 | Theverapperuma | G06V 20/58 |
| 2022/0114764 | A1* | 4/2022 | Beijbom | G05D 1/0274 |
| 2023/0027622 | A1* | 1/2023 | Haeusler | G06T 7/80 |
| 2023/0080764 | A1* | 3/2023 | Beijbom | G01C 21/3804 |
| 2023/0266469 | A1* | 8/2023 | Xia | G06V 20/588 356/4.01 |

FOREIGN PATENT DOCUMENTS

| | | | |
|---|---|---|---|
| KR | 10-2016-0049017 | 5/2016 | |
| KR | 10-2018-0116216 | 10/2018 | |
| KR | 10-2019-0141081 | 12/2019 | |
| WO | WO-2021175434 A1 * | 9/2021 | ......... G06K 9/00805 |

OTHER PUBLICATIONS

Lang et al. "PointPillars: Fast Encoders for Object Detection from Point Clouds," IEEE Conference on Computer Vision and Pattern Recognition, May 7, 2019, 9 pages.

Paigwar et al., "Gndnet: Fast ground plane estimation and point cloud segmentation for autonomous vehicles, " IEEE, 2020 IEEE/RSJ International Conference on Intelligent Robots and Systems (IROS), Oct. 25, 2020, 2150-6.

* cited by examiner

GROUND PLANE ESTIMATION USING LIDAR SEMANTIC NETWORK

CROSS-REFERENCE TO RELATED APPLICATIONS

This application is a continuation of U.S. application Ser. No. 17/067,631, filed Oct. 9, 2020, now issued as U.S. Pat. No. 11,521,394, the entirety of which is incorporated by reference.

FIELD OF THE INVENTION

The description that follows relates generally to ground plane estimation for route planning of autonomous vehicles.

BACKGROUND

A light detection and ranging (LiDAR) sensor mounted on an autonomous vehicle (AV) outputs a three-dimensional (3D) point cloud that provides a detailed understanding of the environment surrounding the AV. Ground plane estimation (GPE) is the measurement of the height of the ground plane with respect to the autonomous vehicle. An accurate GPE contributes to efficient fusion-based autonomous driving. Existing perception pipelines, however, commonly classify LiDAR points as foreground or ground using traditional machine learning techniques.

SUMMARY

Techniques are provided for GPE using a LiDAR semantic network (LSN).

In an embodiment, a method comprises: obtaining, using at least one processor, a point cloud from a depth sensor of a vehicle operating in an environment; encoding, using the at least one processor, the point cloud; estimating, using a deep learning network with the encoded point cloud as input, a ground plane in the environment; determining, using the estimated ground plane and a map of the environment, a drivable area in the environment; planning, using the at least one processor, a path through the environment based on the drivable area; and operating, using a control circuit of the vehicle, the vehicle along the path.

In an embodiment, the deep learning network includes a two-dimensional (2D) convolutional backbone and a ground plane estimation (GPE) head for estimating the ground plane, the method further comprising: obtaining, using the at least one processor, feature maps from a plurality of strides of the 2D convolutional backbone network; upsampling, using the at least one processor, each feature map to an original feature map size; and combining, using the at least one processor and a weighted summation, the upsampled feature maps to generate an output map that estimates the ground plane.

In an embodiment, encoding the point cloud further comprises: dividing the point cloud into 2D pillars in an image embedding; for each pillar, selecting a number of sample points; adding a number of augmentations to the selected sample points; and processing each pillar, using a point network, to obtain a point feature for the pillar; rendering the point features into a point feature map based on their respective pillar locations to create a 2D point feature map; processing, using the 2D convolutional backbone, the 2D point feature map to obtain rich feature maps of different strides; and passing the rich feature map to the GPE head to estimate the ground plane.

In an embodiment, the image embedding is a bird's eye view (BEV) image.

In an embodiment, the GPE head includes one or more convolutional layers.

In an embodiment, a method comprising: obtaining, using at least one processor, a point cloud captured by a depth sensor operating in an environment; encoding, using at least one processor, the point cloud; and estimating, using a deep learning network with the encoded point cloud as input, a ground plane in the environment; comparing, using the at least one processor, the estimated ground plane to a ground truth map to determine a ground plane estimation loss; and updating, using the at least one processor, parameters of the deep learning network based on the determined ground plane estimation loss.

In an embodiment, comparing the estimated ground plane to the ground truth map to estimate a ground plane estimation loss, further comprises minimizing a loss function of the ground plane estimate and the ground truth map.

In an embodiment, the loss function is a smooth-1 regression loss.

In an embodiment, the deep learning network includes a 2D convolutional backbone coupled to a ground plane estimation (GPE) head for estimating the ground plane, the method further comprising: obtaining, using the at least one processor, feature maps from a plurality of strides of the 2D convolutional backbone; upsampling, using the at least one processor, each feature map to an original feature map size; and combining, using the at least one processor and a weighted summation, the upsampled feature maps to generate an output map that estimates the ground plane.

In an embodiment, encoding the point cloud data further comprises: dividing the point cloud into 2D pillars in an image embedding; for each pillar, selecting a number of sample points; adding a number of augmentations to the selected sample points; and processing each pillar, using a point network, to obtain a point feature for the pillar; rendering the point features into a point feature map based on their respective pillar locations to create a 2D point feature map; processing, using the 2D convolutional backbone, the 2D point feature map to obtain rich feature maps of different strides; and passing the rich feature maps to the GPE head to estimate the ground plane.

In an embodiment, the GPE head includes one or more convolutional layers.

In an embodiment, a vehicle comprises: a depth sensor configured to generate a point cloud of an environment; a control circuit; and at least one processor configured to: obtain the point cloud from the depth sensor; encoding the point cloud; estimate, using a deep learning network with the encoded point cloud as input, a ground plane in the environment; determine, using the estimated ground plane and a map of the environment, a drivable area in the environment; plan a path through the environment based on the drivable area; and operate, using the control circuit, the vehicle along the path.

In an embodiment, the deep learning network further comprises: a two-dimensional (2D) convolutional backbone configured to generate feature maps from a plurality of strides; and a ground plane estimation (GPE) head coupled to the 2D convolutional backbone, the GPE head configured to: upsampling each feature map to an original feature map size; and combine, in a weighted summation, the upsampled feature maps to generate an output map that estimates the ground plane.

In an embodiment, encoding the point cloud data further comprises: dividing the point cloud into two-dimensional (2D) pillars in an image embedding; for each pillar, selecting a number of sample points; adding a number of augmentations to the selected sample points; and processing each pillar, using a point network, to obtain a point feature for the pillar; rendering the point features into a point feature map based on their respective pillar locations to create a 2D point feature map; processing, using the 2D convolutional backbone, the 2D point feature map to obtain rich feature maps of different strides; and passing the rich feature maps to the GPE head to estimate the ground plane.

In an embodiment, the GPE head includes one or more convolutional layers.

In an embodiment, a system comprises: at least one processor; memory storing instructions that when executed by the at least one processor, causes the at least one processor to perform operations comprising: obtaining a point cloud captured by a depth sensor operating in an environment; encoding the point cloud; estimating, using a deep learning network with the encoded point cloud as input, a ground plane in the environment; comparing the estimated ground plane to a ground truth map to determine a ground plane estimation loss; and updating parameters of the deep learning network based on the determined ground plane estimation loss.

In an embodiment, comparing the estimated ground plane to the ground truth map to estimate a ground plane estimation loss, further comprises minimizing a loss function of the ground plane estimate and the ground truth map.

In an embodiment, the loss function is a smooth-1 regression loss.

In an embodiment, the operations further comprise: obtaining, using the deep learning network, feature maps from a plurality of strides; upsampling, using the deep learning network, each feature map to an original feature map size; and combining, using a weighted summation, the upsampled feature maps to generate an output map that estimates the ground plane.

In an embodiment, encoding the point cloud data further comprises: dividing the point cloud into two-dimensional (2D) pillars in an image embedding; for each pillar, selecting a number of sample points; adding a number of augmentations to the selected sample points; and processing each pillar, using a point network, to obtain a point feature for the pillar; rendering the point features into a point feature map based on their respective pillar locations to create a 2D point feature map; processing, using the deep learning network, the 2D point feature map to obtain rich feature maps of different strides; and estimating the ground plane using the rich feature maps.

In an embodiment, the deep learning network includes one or more convolutional layers.

One or more of the disclosed embodiments provide one or more of the following advantages.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
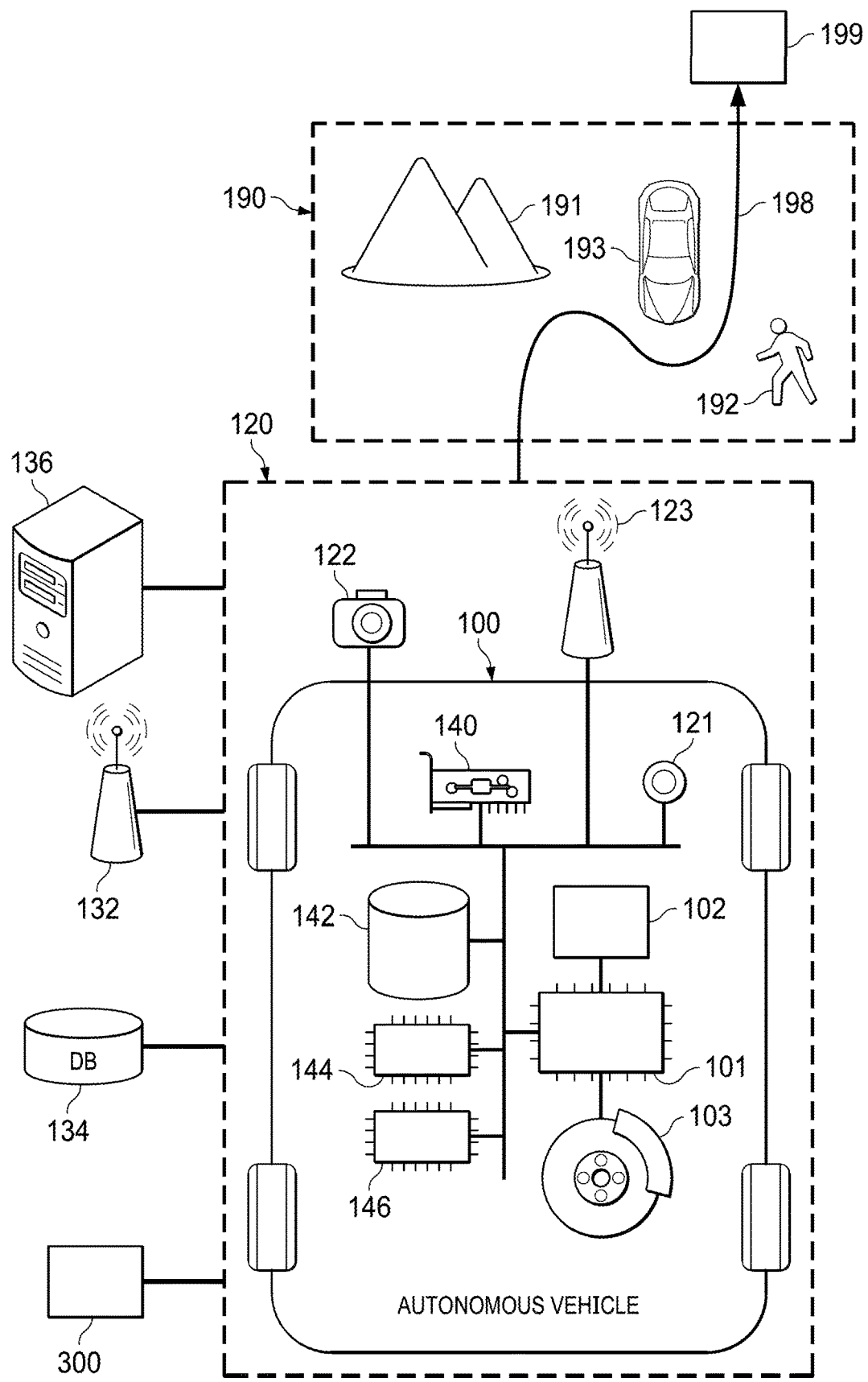
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1 General Overview
2. System Overview
3. Autonomous Vehicle Architecture
4. GPE Using LSN General Overview Techniques are provided for GPE using a LSN. In an embodiment, the LSN inputs a 3D LiDAR point cloud by first dividing the 3D point cloud into two-dimensional (2D) pillars in an image embedding (e.g., a birds-eye view (BEV) image). For each pillar, a number of point cloud samples are selected and processed by a neural network to obtain point features. The point features are used to generate a 2D point feature map based on their respective pillar locations. The 2D point feature map is passed to a 2D convolutional backbone (e.g., a convolutional neural network (CNN)) which generates rich feature maps of different strides. These rich feature maps are input into a detection head and GPE head coupled to the 2D convolutional backbone, which are configured to estimate objects and a ground plane, respectively. These estimates are compared to a ground truth map to calculate a GPE loss. The GPE loss is back-propagated through the LSN to update the parameters (e.g., weights, biases) of the LSN.

In an embodiment, the GPE head is a fully convolutional neural network. Convolutional feature maps at different strides (e.g., strides 8, 16, and 32) are obtained from the 2D convolutional backbone and input into the GPE head. The feature maps are upsampled through a deconvolution layer to obtain the original feature map size. The upsampled maps are combined through weighted summation to obtain a final output map which estimates the ground plane. To train the LSN, GPE loss is minimized using a loss function (e.g., a smooth-11 regression loss) between the output map predicted by the network and a ground truth map. In an embodiment, if annotated ground data is not available for the whole ground truth map, then the four corners of the bottom surfaces of annotated 3D bounding boxes in the output map of the detection head can be used as ground truth data to fill out the ground truth map.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory traverses one or more map segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

As used herein, a "machine learning model" includes any model that is trained on data to make predictions, including without limitation: artificial neural networks, support vector machines, decision trees, regression analysis, Bayesian networks and genetic algorithms.

As used herein, "ground plane" is a set of points that are segmented from other points in a 3D point cloud and represent pulsed light waves reflected from the ground.

As used herein, "estimated ground plane" is the measurement of the height of the ground plane with respect to a vehicle.

As used herein, "drivable area" is portion of the estimated ground plane that is determined to be drivable by a vehicle using, for example, map data, road conditions and traffic laws.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth™, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
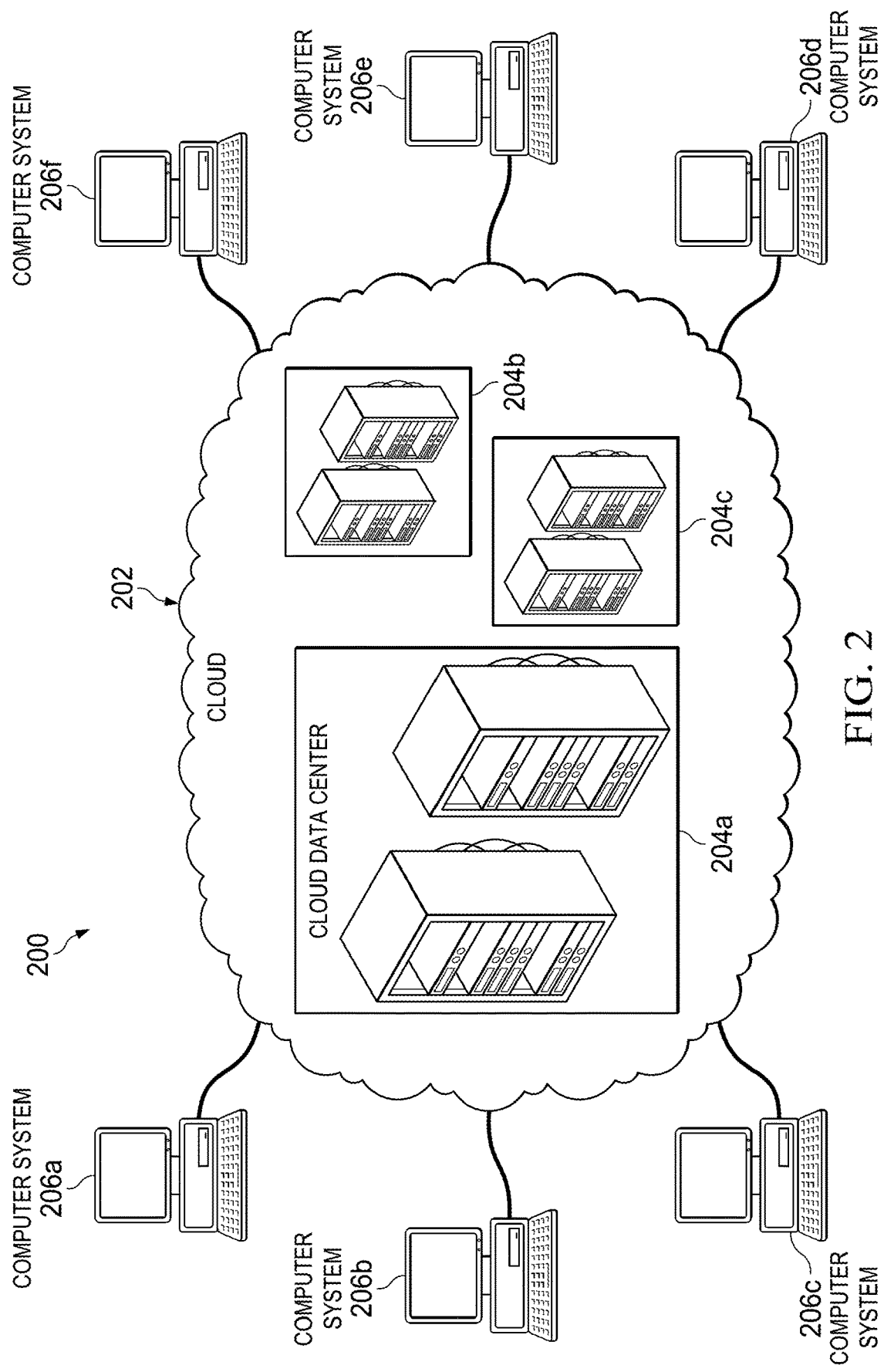
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Example Computer System

Figure 3:
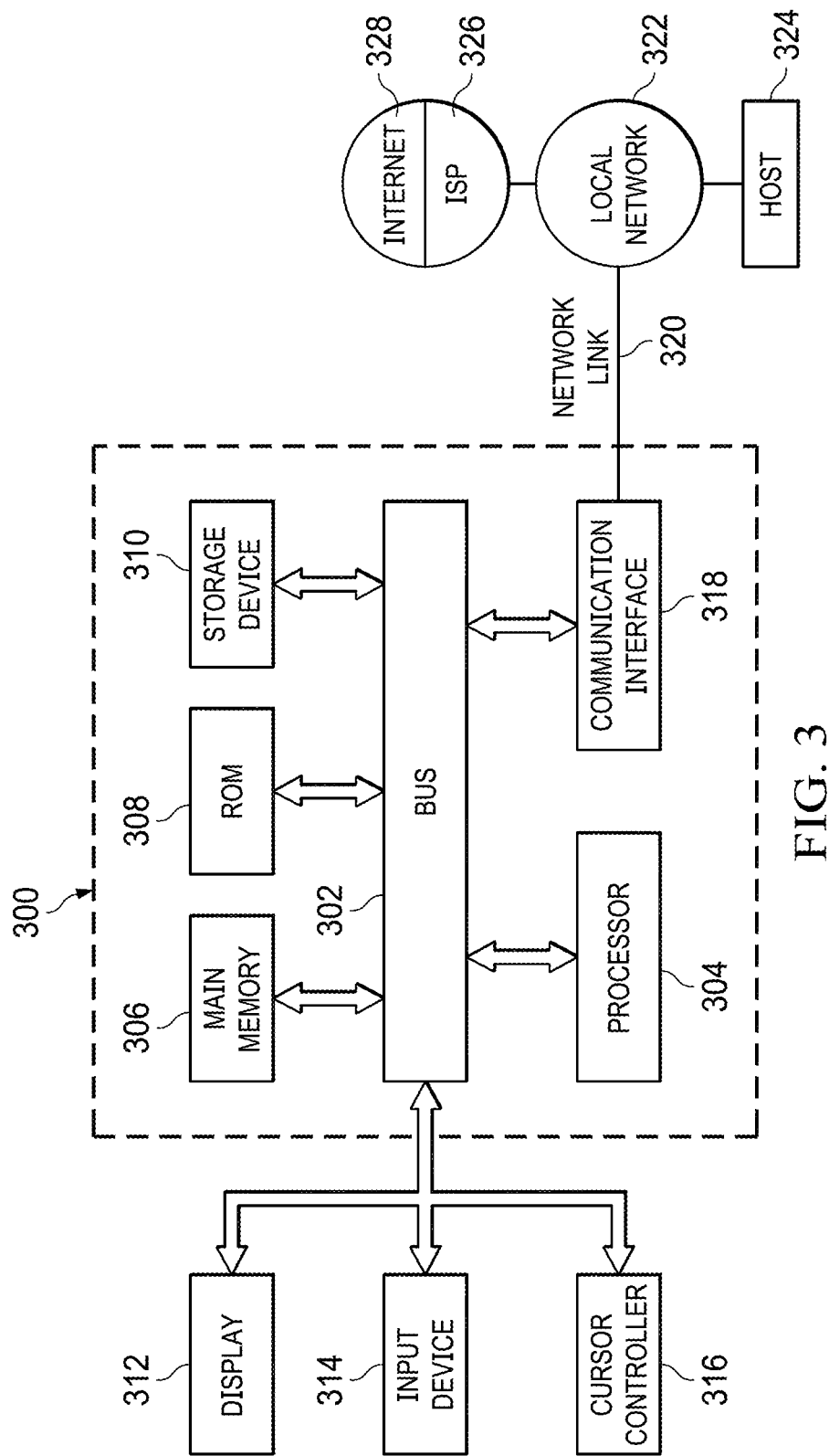
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Example Autonomous Vehicle Architecture

Figure 4:
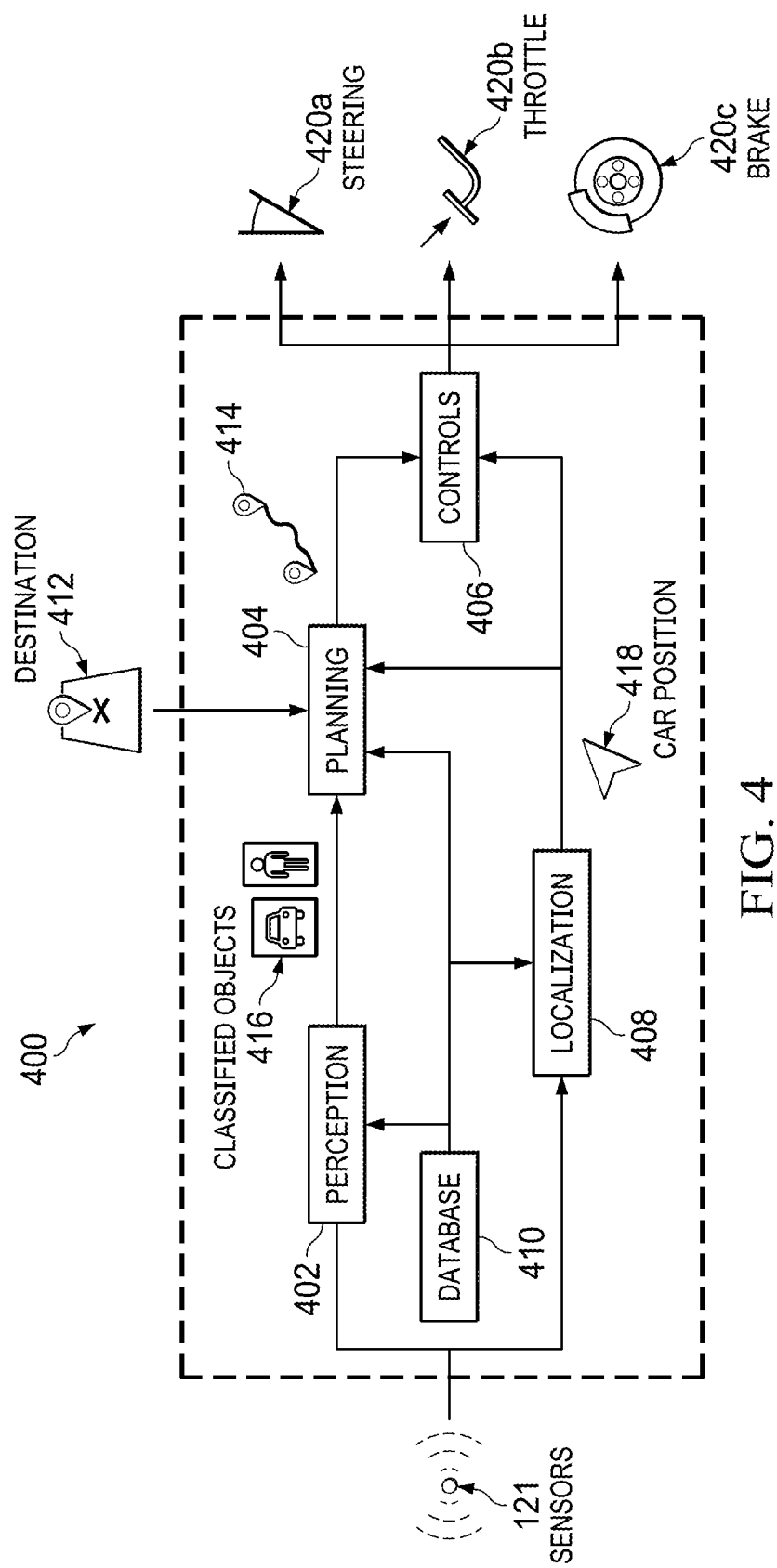
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Example GPE Using LSN

Figure 5:
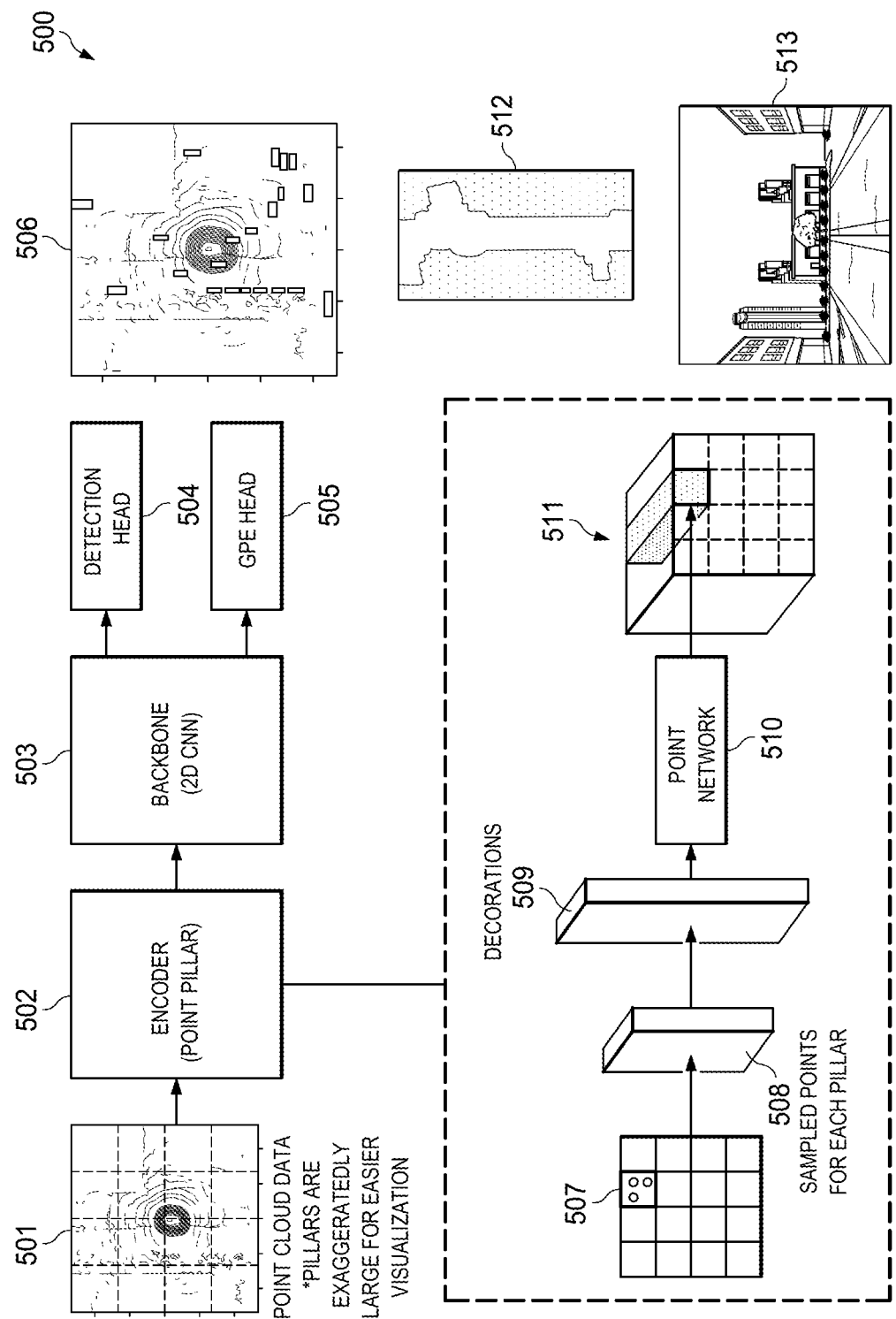
FIG. 5 is a block diagram of a system for GPE using an LSN, in accordance with one or more embodiments.

FIG. 5 is a block diagram of system 500 for GPE using an LSN, in accordance with one or more embodiments. System 500 includes encoder 502, 2D convolutional backbone 503, detection head 504 and GPE head 505. Point cloud 501 (e.g., output by a LiDAR) is input into encoder 502. In an embodiment, the point cloud is converted to stacked pillar tensor 507 and pillar index tensor. Sampled points 508 from each pillar are augmented/decorated 509 with distance and offset measurements $x_c$, $y_c$, $z_c$, $x_p$ and $y_p$, where the c subscript denotes distance of the sampled point to an arithmetic mean of all points in the pillar and the p subscript denotes an offset of the sampled point from the pillar x, y center. The augmented/decorated points are input into point network 510, which uses the augmented points to learn features that can be used to generate a sparse two-dimensional (2D) pseudo-image (point feature map) 511. The point feature map 511 is input into 2D convolutional backbone 503. The features output by 2D convolutional backbone 503 are used by detection head 504 (e.g., a single shot detector (SSD)) to detect and regress three-dimensional (3D) bounding boxes, which are projected into output image 506. Camera view 513 is a visualization of the projected GPE. More details regarding encoder 502 can be found in Lang Alex H. et al. 2019. PointPillars: Fast Encoders for Object Detection from Point Clouds.arXiv:1812.05784[cs.LG].

Figure 6:
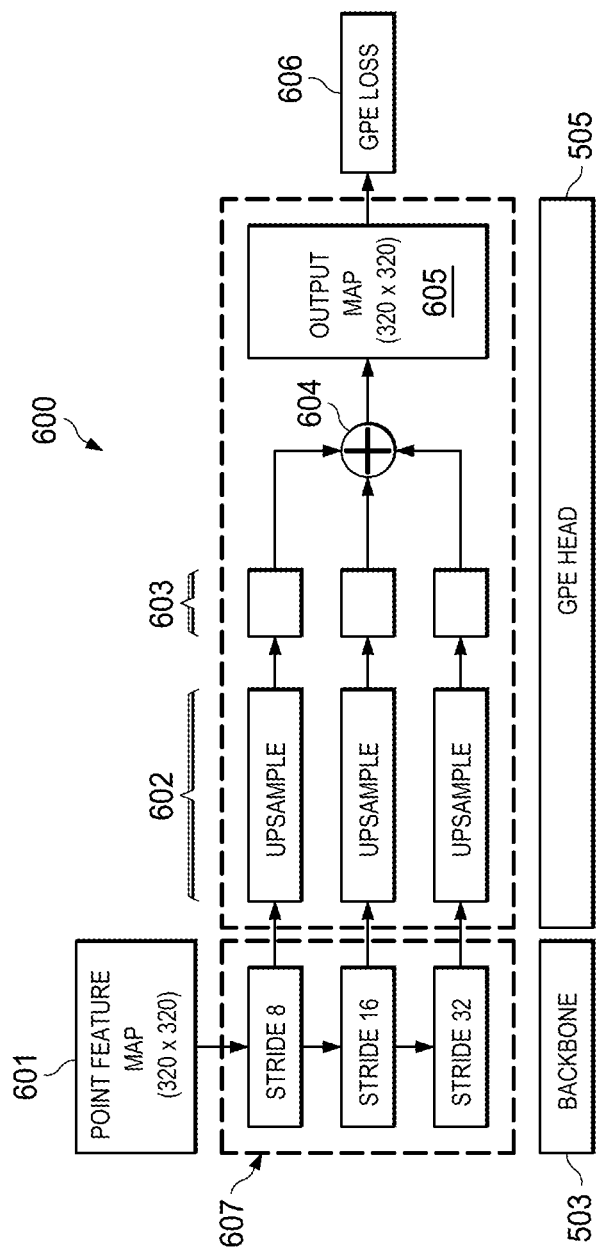
FIG. 6 is a block diagram of a GPE head coupled to the convolutional backbone, in accordance with one or more embodiments.

In an embodiment, 2D convolutional backbone 503 provides point feature map 511 to GPE head 505, which outputs estimated ground plane 512, as described more fully in reference to FIG. 6.

FIG. 6 is a block diagram of a GPE head 505 coupled to 2D convolutional backbone 503, in accordance with one or more embodiments. In an embodiment, GPE head 505 is a CNN. Point feature map 601 (e.g., 320×320) is input into 2D convolutional backbone 503. Convolutional feature maps at different strides 607 (e.g., strides 8, 16, and 32) are obtained from the 2D convolutional backbone 503 and input into GPE head 505. The feature maps are upsampled by upsamplers 602 through a deconvolution layer to obtain up sampled feature maps at the original size (e.g., 320×320) of point feature map 601. The upsampled feature maps 603 are combined through weighted summation 604 to obtain a final output map 605 (e.g., 320×320), which is the GPE. During AV operation, output map 605 is used by a perception pipeline or route planner of the AV to determine a drivable area based on the ground plane estimate and other data (e.g., a map), and compute a path through the drivable area for the AV. To train LSN 500, GPE loss 606 is minimized using a loss function (e.g., a smooth-l1 regression loss) between the output map 605 (i.e., the GPE) and a ground truth map. GPE loss 606 is then backpropagated to update parameters (e.g., weights, biases) of LSN 500. In an embodiment, if annotated ground data is not available for the whole ground truth map, then the four corners of the bottom surfaces of annotated 3D bounding boxes in output image 506 are used as ground truth data to fill in the missing annotated ground data in the ground truth map.

Example Processes

Figure 7:
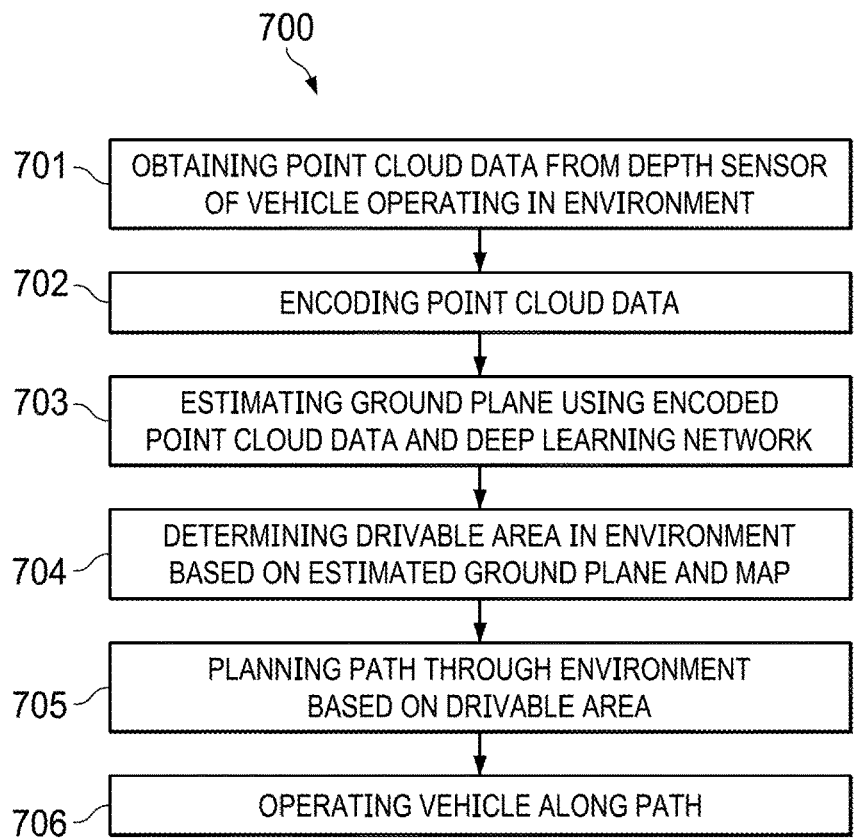
FIG. 7 is a flow diagram of a process of route planning based on GPE using and LSN, in accordance with one or more embodiments.

FIG. 7 is a flow diagram of a process of route planning based on GPE using and LSN, in accordance with one or more embodiments. Process 700 can be implemented, for example, by the computer system 300 described in reference to FIG. 3.

Process 700 includes the steps of: obtaining a point cloud from a depth sensor of a vehicle operating in an environment (701), encoding the point cloud (702) estimating, using a deep learning network with the encoded point cloud as input, a ground plane in the environment (703); determining, using the estimated ground plane and a map of the environment, a drivable area in the environment (704); planning a path through the environment based on the drivable area (705); and operating, using a control circuit of the vehicle, the vehicle along the path (706).

In an embodiment, the point cloud is a LiDAR point cloud and the encoding uses point pillars, as described in reference to FIG. 5. In an embodiment, the deep learning network includes a 2D convolutional backbone (e.g., VGG, residual neural network) coupled to a detection head for estimating object detections and a GPE head for GPE.

Figure 8:
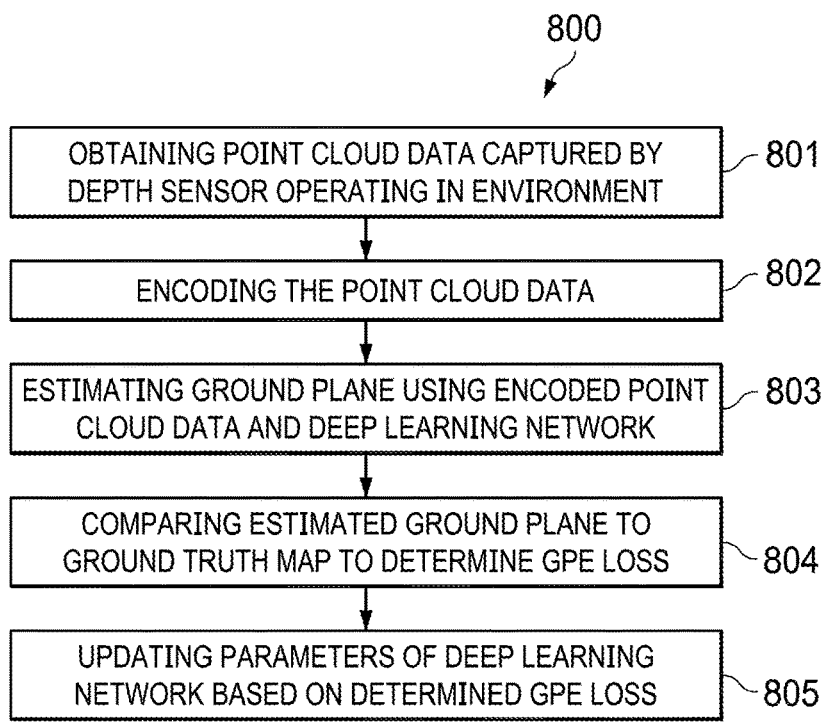
FIG. 8 is a flow diagram of a process of training the LSN for GPE, in accordance with one or more embodiments.

FIG. 8 is a flow diagram of a process of training the LSN for GPE, in accordance with one or more embodiments. Process 800 can be implemented, for example, by the computer system 300 described in reference to FIG. 3.

Process 800 includes the steps of: obtaining a point cloud data captured by a depth sensor operating in an environment (801); encoding the point cloud data (802); estimating, using a deep learning network with the encoded point cloud data as input, a ground plane in the environment (803); comparing the estimated ground plane to a ground truth map to determine a GPE loss (804); and updating parameters (e.g., weights, biases) of the deep learning network based on the GPE loss (805).

For example, to train the deep learning network, a GPE loss is minimized using a loss function (e.g., a smooth-l1 regression loss) between the GPE and a ground truth map. GPE loss 606 is then back-propagated to update parameters (e.g., weights, biases) of LSN 500.

In an embodiment, if annotated ground data is not available for the whole ground truth map, then the four corners of the bottom surfaces of annotated 3D bounding boxes are used as ground truth data to fill in the missing annotated ground data in the ground truth map.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
obtaining, using at least one processor, a point cloud from a depth sensor of a vehicle operating in a driving environment;
encoding, using a two-dimensional (2D) convolutional backbone network executed by the at least one processor, the point cloud, the encoding comprising:
dividing the point cloud into a plurality of two-dimensional (2D) pillars;
obtaining a point feature for each pillar of the plurality of pillars by processing using a point network;
rendering the point features of the plurality of pillars into a point feature map based on respective pillar locations to create a 2D point feature map;
processing the 2D point feature map to obtain rich feature maps of different strides; and
providing the rich feature maps to a ground plane estimation (GPE) head executed by the at least one processor; and
estimating, using the GPE head executed by the at least one processor, a ground plane in the driving environment using the rich feature maps.

2. The method of claim 1, wherein obtaining the point feature for each pillar of the plurality of pillars by processing using the point network comprises:
selecting a number of sample points corresponding to a respective pillar;
adding one or more augmentations to the selected sample points; and
processing the respective pillar with the one or more augmentations to obtain the point feature for the respective pillar using the point network.

3. The method of claim 2, wherein adding one or more augmentations to the selected sample points comprises augmenting at least one sample point of the selected sample points with distance and offset measurements, and
wherein the distance measurement represents a distance of the at least one sample point to an arithmetic mean of all points in the respective pillar and the offset measurement represents an offset of the at least one sampled point from a center of the respective pillar.

4. The method of claim 1, wherein estimating the ground plane in the driving environment using the rich feature maps comprises:
upsampling one or more of the rich feature maps to an original feature map size; and
combining the one or more upsampled feature maps to generate an output map that estimates the ground plane using a weighted summation.

5. The method of claim 1,
wherein the 2D convolutional backbone network comprises one of a Visual Geometry Group (VGG) convolutional neural network or a residual neural network, and
wherein the GPE head includes one or more convolutional layers.

6. The method of claim 1, further comprising:
accessing a map of the driving environment;
determining a drivable area in the driving environment using the estimated ground plane and the map;
planning a trajectory through the driving environment based on the drivable area; and
operating the vehicle along the trajectory using a control circuit of the vehicle.

7. The method of claim 1, further comprising:
determining a ground plane estimation loss based on comparing the estimated ground plane to a ground truth map corresponding to the 2D convolutional backbone network; and
updating parameters of the 2D convolutional backbone network based on the determined ground plane estimation loss.

8. The method of claim 7, wherein the 2D convolutional backbone network comprises a LiDAR semantic network (LSN), and wherein updating parameters of the 2D convolutional backbone network comprises updating one or more weights of one or more nodes of the LSN.

9. A vehicle comprising:
   a depth sensor configured to generate a point cloud of a driving environment; and
   at least one processor configured to perform operations comprising:
   obtaining the point cloud from the depth sensor of a vehicle operating in the driving environment;
   encoding, using a two-dimensional (2D) convolutional backbone network executed by the at least one processor, the point cloud, the encoding comprising:
   dividing the point cloud into a plurality of two-dimensional (2D) pillars;
   obtaining a point feature for each pillar of the plurality of pillars by processing using a point network;
   rendering the point features of the plurality of pillars into a point feature map based on respective pillar locations to create a 2D point feature map;
   processing the 2D point feature map to obtain rich feature maps of different strides; and
   providing the rich feature maps to a ground plane estimation (GPE) head executed by the at least one processor; and
   estimating a ground plane in the driving environment using the rich feature maps.

10. The vehicle of claim 9, wherein obtaining the point feature for each pillar of the plurality of pillars by processing using the point network comprises:
   selecting a number of sample points corresponding to a respective pillar;
   adding one or more augmentations to the selected sample points; and
   processing the respective pillar with the one or more augmentations to obtain the point feature for the respective pillar using the point network.

11. The vehicle of claim 10, wherein adding one or more augmentations to the selected sample points comprises augmenting at least one sample point of the selected sample points with distance and offset measurements, and
   wherein the distance measurement represents a distance of the at least one sample point to an arithmetic mean of all points in the respective pillar and the offset measurement represents an offset of the at least one sampled point from a center of the respective pillar.

12. The vehicle of claim 9, wherein estimating the ground plane in the driving environment using the rich feature maps comprises:
   upsampling one or more of the rich feature maps to an original feature map size; and
   combining the one or more upsampled feature maps to generate an output map that estimates the ground plane using a weighted summation.

13. The vehicle of claim 9,
   wherein the 2D convolutional backbone network comprises one of a Visual Geometry Group (VGG) convolutional neural network or a residual neural network, and
   wherein the GPE head includes one or more convolutional layers.

14. The vehicle of claim 9, wherein the operations further comprise:
   accessing a map of the driving environment;
   determining a drivable area in the driving environment using the estimated ground plane and the map;
   planning a trajectory through the driving environment based on the drivable area; and
   operating the vehicle along the trajectory using a control circuit of the vehicle.

15. The vehicle of claim 9, the operations further comprising:
   determining a ground plane estimation loss based on comparing the estimated ground plane to a ground truth map corresponding to the 2D convolutional backbone network; and
   updating parameters of the 2D convolutional backbone network based on the determined ground plane estimation loss.

16. The vehicle of claim 15, wherein the 2D convolutional backbone network comprises a LiDAR semantic network (LSN), and wherein updating parameters of the 2D convolutional backbone network comprises updating one or more weights of one or more nodes of the LSN.

17. A system comprising:
   a depth sensor configured to generate a point cloud of a driving environment; and
   at least one processor configured to perform operations comprising:
   obtaining the point cloud from the depth sensor of a vehicle operating in the driving environment;
   encoding, using a two-dimensional (2D) convolutional backbone network executed by the at least one processor, the point cloud, the encoding comprising:
   dividing the point cloud into a plurality of two-dimensional (2D) pillars;
   obtaining a point feature for each pillar of the plurality of pillars by processing using a point network;
   rendering the point features of the plurality of pillars into a point feature map based on respective pillar locations to create a 2D point feature map;
   processing the 2D point feature map to obtain rich feature maps of different strides; and
   providing the rich feature maps to a ground plane estimation (GPE) head executed by the at least one processor; and
   estimating a ground plane in the driving environment using the rich feature maps.

18. The system of claim 17, wherein obtaining the point feature for each pillar of the plurality of pillars by processing using the point network comprises:
   selecting a number of sample points corresponding to a respective pillar;
   adding one or more augmentations to the selected sample points; and
   processing the respective pillar with the one or more augmentations to obtain the point feature for the respective pillar using the point network.

19. The system of claim 18, wherein adding one or more augmentations to the selected sample points comprises augmenting at least one sample point of the selected sample points with distance and offset measurements, and
   wherein the distance measurement represents a distance of the at least one sample point to an arithmetic mean of all points in the respective pillar and the offset measurement represents an offset of the at least one sampled point from a center of the respective pillar.

20. The system of claim 17,
   wherein the 2D convolutional backbone network comprises one of a Visual Geometry Group (VGG) convolutional neural network or a residual neural network, and wherein the GPE head includes one or more convolutional layers.

21. The system of claim 17, wherein the operations further comprise:
   accessing a map of the driving environment;
   determining a drivable area in the driving environment using the estimated ground plane and the map;
   planning a trajectory through the driving environment based on the drivable area; and
   operating the vehicle along the trajectory using a control circuit of the vehicle.

22. The system of claim 17, the operations further comprising:
   determining a ground plane estimation loss based on comparing the estimated ground plane to a ground truth map corresponding to the 2D convolutional backbone network; and
   updating parameters of the 2D convolutional backbone network based on the determined ground plane estimation loss.

23. The system of claim 22, wherein the 2D convolutional backbone network comprises a LiDAR semantic network (LSN), and wherein updating parameters of the 2D convolutional backbone network comprises updating one or more weights of one or more nodes of the LSN.

* * * * *